(12) United States Patent
Ciesicki (10) Patent No.: US 11,659,829 B2
(45) Date of Patent: May 30, 2023

(54) SYSTEM FOR MOLE ERADICATION

(71) Applicant: Idea Orchard Partners, SARL, Acigné (FR)

(72) Inventor: Matthew Ciesicki, Paris (FR)

(73) Assignee: Idea Orchard Partners, SARL, Acigné (FR)

( * ) Notice: Subject to any disclaimer, the term of this patent is extended or adjusted under 35 U.S.C. 154(b) by 0 days.

(21) Appl. No.: 17/333,239

(22) Filed: May 28, 2021

(65) Prior Publication Data
US 2021/0368773 A1 Dec. 2, 2021

Related U.S. Application Data

(60) Provisional application No. 63/032,296, filed on May 29, 2020.

(51) Int. Cl.
*A01M 17/00* (2006.01)

(52) U.S. Cl.
CPC .................... *A01M 17/00* (2013.01)

(58) Field of Classification Search
CPC ...... A01M 29/30; A01M 27/00; A01M 17/00; A01M 23/36
USPC ............................... 43/77–79, 124
See application file for complete search history.

(56) References Cited

U.S. PATENT DOCUMENTS

| | | | | |
|---|---|---|---|---|
| 835,357 A | * | 11/1906 | Janeway | 111/96 |
| 1,191,010 A | * | 7/1916 | Lauderbaugh | A01M 23/00 43/79 |
| 1,790,740 A | * | 2/1931 | Armstrong | A01M 23/36 43/80 |
| 1,965,177 A | * | 7/1934 | Finkl | A01B 1/24 100/295 |
| 2,020,571 A | * | 11/1935 | Pick | A01B 1/243 111/99 |
| 2,086,826 A | * | 7/1937 | Smith | A01M 23/36 248/156 |
| 2,390,686 A | * | 12/1945 | Bishop | A01M 25/006 111/95 |

(Continued)

FOREIGN PATENT DOCUMENTS

| | | | | |
|---|---|---|---|---|
| CN | 109329263 A | * | 2/2019 | ............ A01M 17/00 |
| EP | 0150339 A2 | * | 8/1985 | |

(Continued)

OTHER PUBLICATIONS

International Search Report and Written Opinion of the International Searching Authority; Application No. PCT/IB2021/000368; Completed: Nov. 2, 2021; dated Nov. 11, 2021; 11 Pages.

(Continued)

*Primary Examiner* — Peter M Poon
*Assistant Examiner* — Morgan T Jordan
(74) *Attorney, Agent, or Firm* — Whitmyer IP Group LLC (57) ABSTRACT

A mole eradication system having a sleeve having a distal end for positioning in the ground, a rod having a distal end axially extending at least partially within said sleeve, at least one sharp connected near the distal end of said rod and radially extending from said rod, said sleeve and said rod axially movable in a first direction with respect to each other to radially expose said at least one sharp near a distal end of said sleeve.

19 Claims, 6 Drawing Sheets

(56) References Cited

U.S. PATENT DOCUMENTS

| | | | | |
|---|---|---|---|---|
| 4,667,436 | A * | 5/1987 | Benson | A01K 79/02 43/132.1 |
| 4,791,995 | A * | 12/1988 | Hochlan, Jr. | A01B 1/06 111/99 |
| 5,191,733 | A * | 3/1993 | Withrow | A01M 27/00 43/79 |
| 5,776,422 | A * | 7/1998 | Kawasaki | A01M 17/00 43/140 |
| 7,779,574 | B1 * | 8/2010 | Miller | A01M 27/00 43/79 |
| 2004/0103578 | A1 * | 6/2004 | Hagen | A01M 27/00 43/79 |
| 2012/0000114 | A1 * | 1/2012 | Clark | A01M 27/00 43/79 |
| 2013/0227876 | A1 * | 9/2013 | Neymeyer | A01M 29/30 43/124 |
| 2014/0165453 | A1 * | 6/2014 | Baker | A01M 17/00 43/124 |
| 2016/0330950 | A1 * | 11/2016 | Preston | A01M 17/00 |

FOREIGN PATENT DOCUMENTS

| | | | | |
|---|---|---|---|---|
| FR | 2731584 | A1 * | 9/1996 | A01M 23/36 |
| FR | 2771257 | A3 | 5/1999 | |
| FR | 2856888 | A1 * | 1/2005 | A01M 23/36 |
| FR | 2856890 | A1 * | 1/2005 | A01M 23/36 |
| FR | 3076980 | A1 * | 7/2019 | |
| KR | 20140005523 | A * | 1/2014 | |
| WO | WO-2010022795 | A1 * | 3/2010 | A01M 23/36 |

OTHER PUBLICATIONS

International Preliminary Report on Patentability and Written Opinion of the International Searching Authority Application No. PCT/IB2021/000368; Completed: Nov. 17, 2022; dated Dec. 8, 2022; 7 Pages.

* cited by examiner

SYSTEM FOR MOLE ERADICATION

TECHNICAL FIELD

The present invention relates to a system for the safe and efficient eradication of moles and other underground-dwelling animals.

BACKGROUND

Moles destroy grass lawns and gardens with their unsightly burrowing activity. Moles consume 70-100% of their body weight per day in a diet largely comprised of beneficial earthworms, thus rendering the soil much less fertile and productive.

Methods to eradicate moles have been largely unchanged for many decades, if not centuries, primarily by poison (indiscriminate and dangerous to pets and children), fumigation (inefficient and unecological), repellent (very inefficient as animal just changes locale), and trapping.

Traps are far and away the most effective way of dealing with moles. Most traps require locating the tunnel of the mole and digging down nearly a foot into the ground to insert the trap in the soil. This is laborious and adds to the destruction of the lawn or garden. Usually a spring-loaded blade or snare system kills the mole. Once sprung, the trap must be dug out from the soil and the dead mole must be recovered and disposed. Live trap versions exist, with the same general installation/recovery issues. Above ground spear-type styles eliminate the need for in-ground installation but are dangerous to pets and children who might accidently knock over and activate the powerful spear or blades.

An ancient method of dealing with this pest has been to insert thickened stems of thorny rose plants vertically into mole tunnels. Moles, largely blind, come in contact with the sharp thorns, cut themselves, and die.

SUMMARY

It is an object of the invention to provide a system for the efficient and safe eradication of moles.

It is an object of the invention to provide a system that does not require laborious digging of the lawn to place and retrieve the trap.

It is an object of the invention to provide a system in which there is no additional destruction of the lawn with the trap placement.

It is an object of the invention to provide a system which is easy to install, retrieve and reinstall elsewhere.

It is an object of the invention to provide a system that is safer for children and pets.

It is an object of the invention to provide a system where there are no decomposing bodies to dispose.

It is an object of the invention to provide a system with little to no undesirable environmental impacts.

In one aspect of the invention, a mole eradication system is provided having a sleeve having a distal end for positioning in the ground, a rod having a distal end axially extending at least partially within said sleeve, at least one sharp connected near the distal end of said rod and radially extending from said rod, said sleeve and said rod axially movable in a first direction with respect to each other to radially expose said at least one sharp near a distal end of said sleeve.

DETAILED DESCRIPTION

Figure 1A:
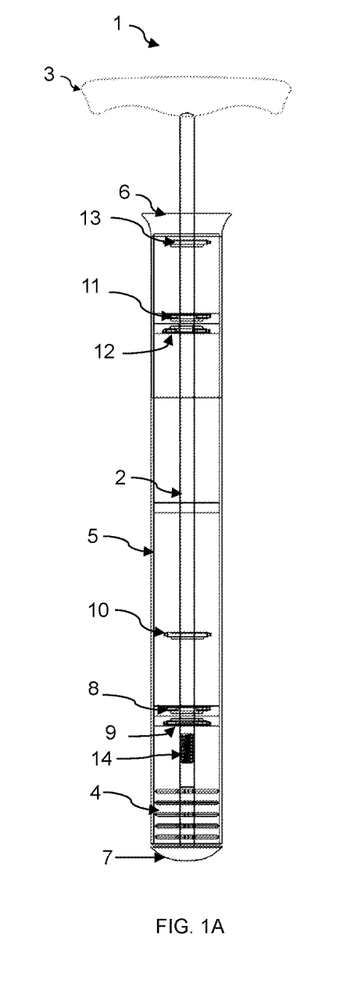
FIG. 1A is a front view of the invention shown in a safe position.
Figure 1B:
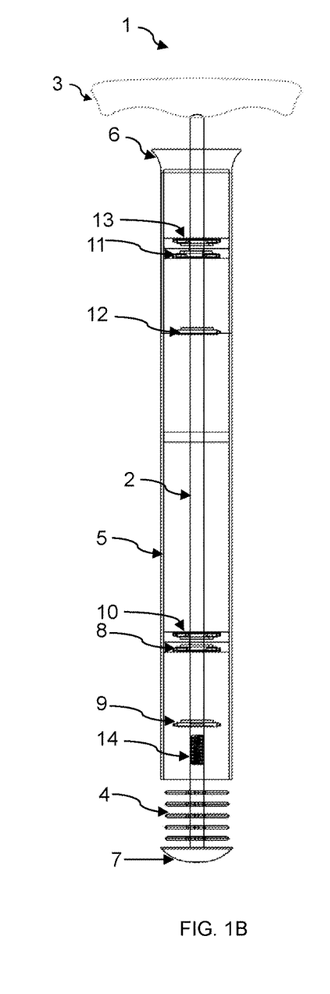
FIG. 1B is a front view of the invention shown in an active position.
Figure 2:
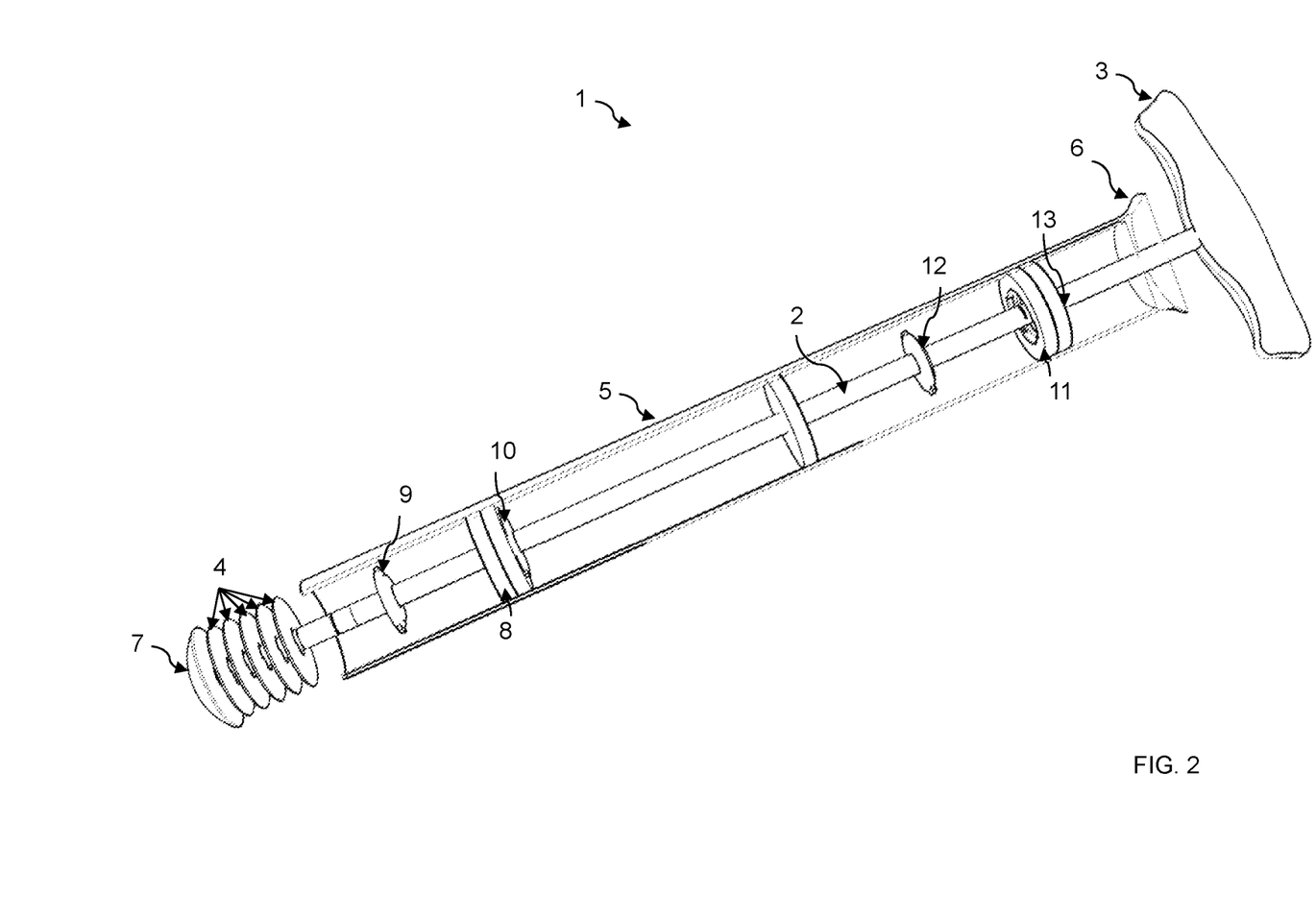
FIG. 2 is a front, cutaway view of the invention, shown in an active position.
Figure 3A:
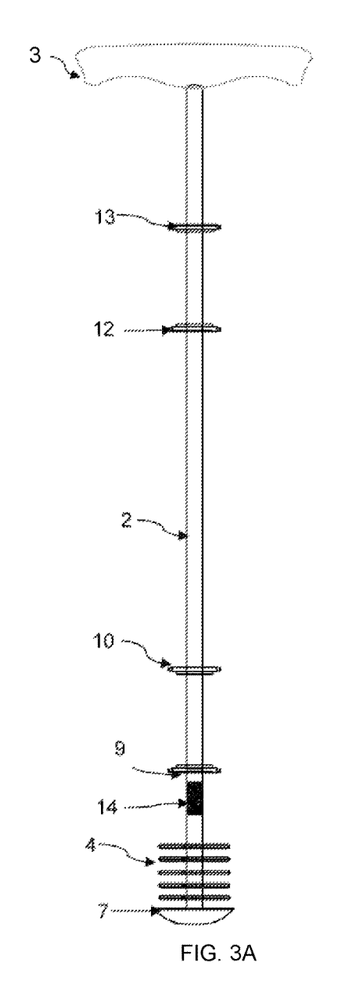
FIG. 3A shows a front view of the rod of the present invention with preferred dimensions in centimeters.
Figure 3B:
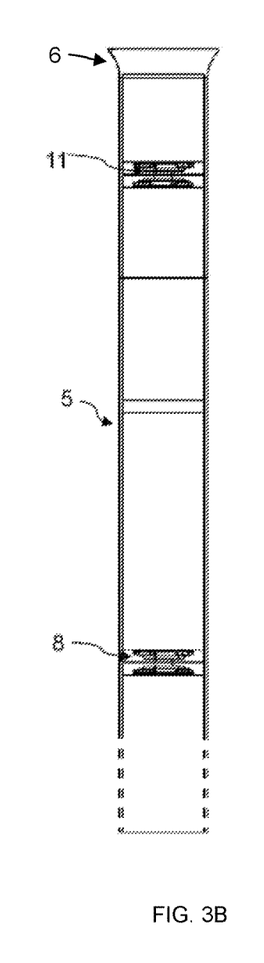
FIG. 3B shows a front view of the sleeve of the present invention with preferred dimensions in centimeters.
Figure 3C:
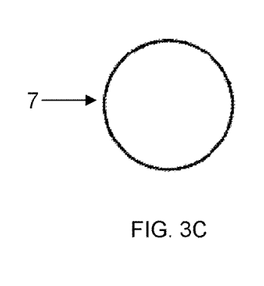
FIG. 3C shows a bottom view of the present invention with preferred dimensions in centimeters.
Figure 4A:
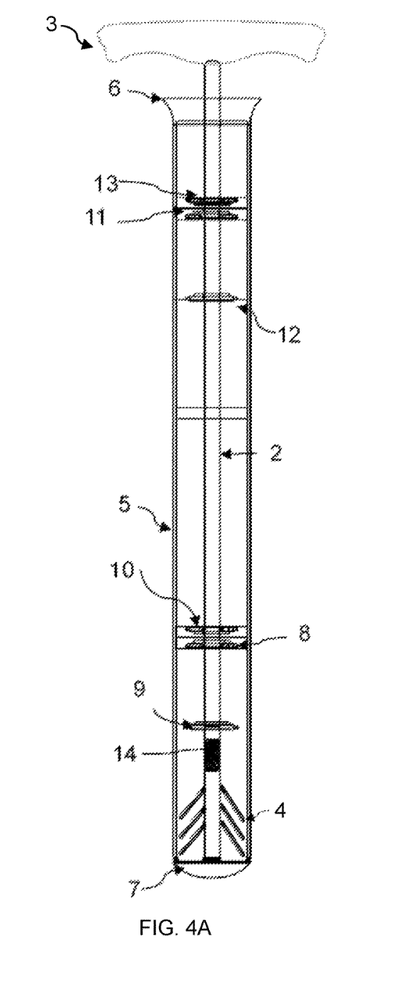
FIG. 4A shows a front view of the present invention with preferred dimensions in centimeters.
Figure 4B:
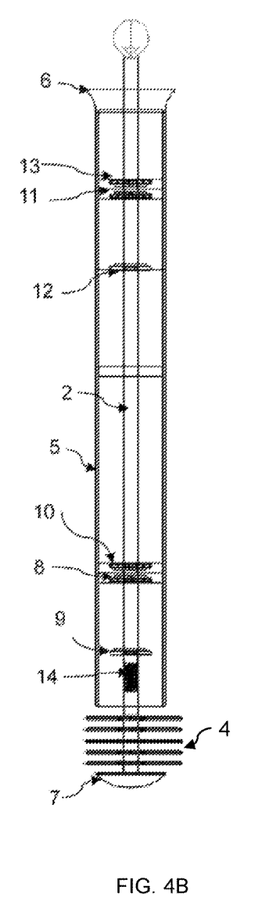
FIG. 4B shows a front view of the present invention without a handle with preferred dimensions in centimeters.
Figure 4C:
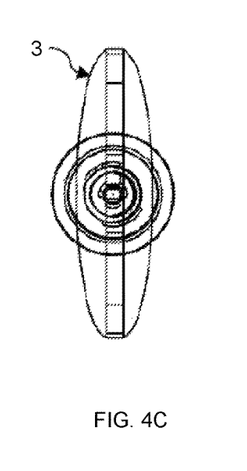
FIG. 4C shows a top view of the present invention with preferred dimensions in centimeters.

As shown in FIGS. 1A, 1B, and 2 the mole eradication system 1 has a rod 2 attached to a handle 3. The rod 2 and/or the handle 3 may be made of metal or hardened plastic.

The rod 2 has at least one sharp 4. The sharps 4 may be steel or ceramic blades, though ceramic blades are preferred over steel to prevent oxidation. The sharps 4 may have a pointed tip or an arcuate blade edge. The sharps may be a needle-like spike, or stiffened wire bristles. The sharps 4 may be circular blades, as shown in FIGS. 1A and 1B.

Figure 5:
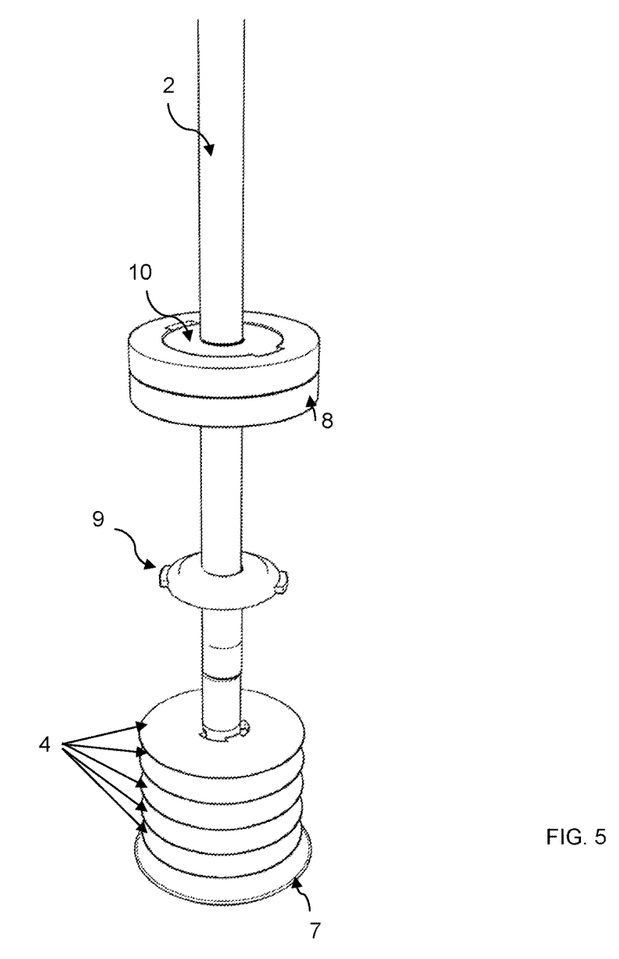
FIG. 5 is an enlarged view of a bottom portion of the invention without a sleeve.
Figure 6:
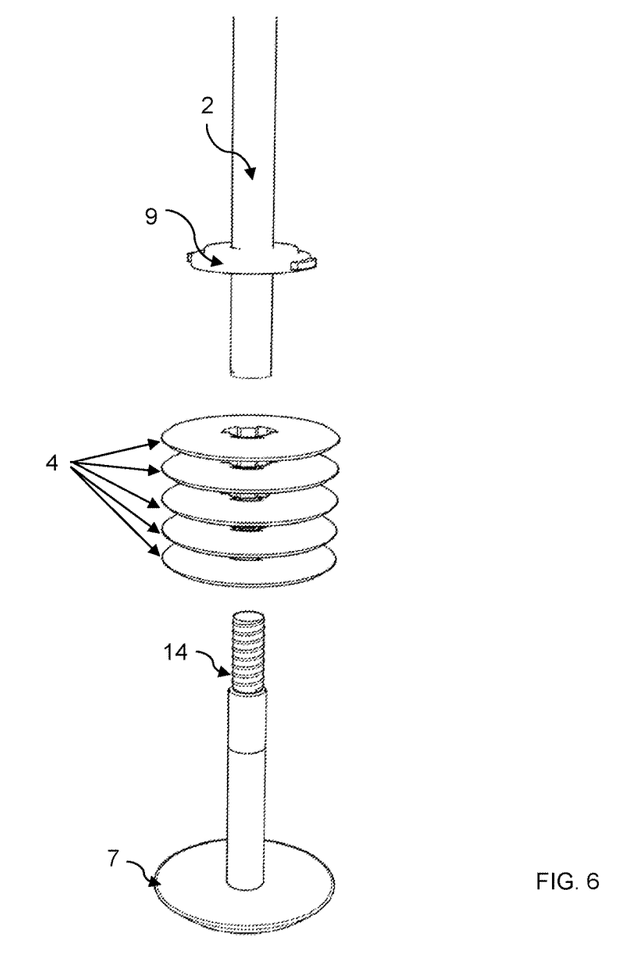
FIG. 6 is an exploded view of a bottom portion of the invention without a sleeve.

The sharps 4 may be connected to the rod 2 via a cartridge. The sharps 4 may alternatively be threaded to screw into the rod 2 via corresponding threads 14 (see FIGS. 5 and 6). The sharps 4 may alternatively be connected to the rod 2 via a twist-lock. The sharps 4 may be removable from the rod 2 for sharpening, cleaning or replacement. Alternatively, the sharps 4 may be permanently connected to the rod 2. The sharps 4 may be disposed in layers or bands.

A sleeve 5 may be provided having a top side 6 and a nose cone side. The nose cone 7 may be physically attached to the rod 2 and engageable with the sleeve 5. Alternatively, the nose cone 7 may be provided on the sleeve 5. The rod 2 may be disposed inside the sleeve 5 such that the handle 3 extends out of the top of the sleeve 5. The sleeve's 5 nose cone 7 may preferably be spike-like or needle-like so as to penetrate soil and help the device stick in the ground and be more stable. The sleeve 5, including at least one of the top 6 and nose cone 7 may be made of metal or hardened plastic. The sleeve 5 may be able to move axially relative to the rod 2, or vice versa. The distance of the relative movement may be approximately 5 cm (2 inches). The sleeve 5 may be approximately 30 cm (12 inches) in length. The nose cone 7 may have a diameter of approximately 5 cm (2 inches).

The sleeve 5 and rod 2 may include one or more twist locks 8, 9, 10, 11, 12, and 13 to lock the sleeve 5 in active and safe positions. As shown in FIGS. 1A and 1B, two twist lock mechanisms, 8, 9, 10 and 11, 12 and 13 may be provided. Twist lock parts 8 and 11 each contain two female twist lock receptors. Twist lock parts 9, 10, 12, and 13 are each male twist lock parts that engage with the corresponding female parts 8 and 11. In a safe position, male parts 9 and 11 engage with the bottom female receptors of parts 8 and 11. In an active position, male parts 10 and 13 engage with upper female receptors of parts 8 and 11. As shown in FIGS. 1A and 1B, male parts 9, 10, 12, and 13 are connected to the rod 2 and female parts 8 and 11 are connected to the sleeve 5. This configuration may be altered depending on need within the level of a person having ordinary skill in the art.

To use the system 1, a user may locate and gently clear soil from atop a mole hole. The user may insert the system 1 vertically into the hole, until reaching the bottom of the hole, usually ranging from 8 inches (20 cm) to a maximum depth of 12 inches (30 cm). The user may turn the rod 2 (such as via handle 3) to unlock the twist-lock locking mechanism. The user may slide the sleeve 5 upwards approximately two inches (5 cm), exposing the sharps 4. The user may then lock the sleeve 5 in the active position by turning the rod 2. Alternatively, a person having ordinary skill in the art would understand that the system 1 could be configured such that the sleeve 5 is rotated, or that the rod 2 is depressed to expose the sharps 4.

The user may wait a few days until mole activity has ceased. To retract the system 1, the user may push the sleeve 5 downward such that it contacts the nose cone 7. The user may turn the sleeve 5 in an opposite direction (eg: clockwise), utilizing the twist-lock to connect the sleeve 5 in the safe position with the sharps 4 completely covered and locked. The user may then remove the system 1 from the soil for cleaning or storage.

FIGS. 3A-C and 4A-C provide preferred, exemplary dimensions for the system 1 in millimeters. It is understood that one of ordinary skill in the art could modify these dimensions as needed. The dimensions in FIGS. 3A-3C and 4A-4C assume mole tunnels that are about 50 mm in diameter and 20-30 cm deep. Other measurements are possible. For instance, if mole tunnels are 35-40 mm in diameter, the sleeve 5 and nose cone 7 may each be about 32 mm in diameter, with the sleeve 5 having an inner diameter of about 30 mm. In this case, sharps 4 may have a diameter of about 28 mm. If mole tunnels are only 6-12 cm deep (2.5-5 inches), the length of sleeve 4 may be about 25 cm or 34 cm (10 inches or 13.3 inches) instead of 44 cm, and the length of rod 2 may be 45 cm instead of 55 cm. A shorter system 1 will have the benefit of lowering the center of gravity and increasing stability when deployed in a mole tunnel.

In an alternative embodiment, the sharps 4 may be movable between an undeployed position to a deployed position. For example, in an undeployed position, the sharps 4 may be pointed-down, and in the deployed position, the sharps are pointed-out. This movement of the sharps 4 may be actuated by the rotation or movement of the sleeve 5, or by a movement of the handle 3. For example, the sharps 4 may be biased downwards by the presence of the sleeve 5. When the sleeve 5 is moved to the active position, the sharps 4 may move to a pointed-out position. When the sleeve 5 is replaced, the sharps 4 may return to the pointed-down position.

The sleeve 5 may also have slits through which the sharps 4 are deployed. Slits may help prevent soil from blocking the deployment and recovery of the sharps 4 upon installation and retraction. The slits may provide further safety in the use of the system 1. For example, the sharps 4 may be misaligned with the slits 4 with the slits when the sleeve 5 is in the safe position. In the active position, the slits may be aligned with the sharps 4 such that a movement of the handle 3 exposes the sharps 4 through the slits. The slits may be disposed in bands.

Due to the 360-degree dispersal of the sharps 4, alignment of the device is not required for the device to be effective; it is lethal in all directions. However, 'guillotine' style traps must be aligned close to perpendicular to the axis of the mole tunnel, otherwise the blade may not strike the target—a hit-or-miss proposition, especially when it is difficult to discern the direction of an underground mole tunnel.

The system 1 may also be used without a sleeve 5 and just a rod 2, though extra care must be taken when handling the system 1 as the sharps 4 will always be exposed.

The system 1 may also be flexible. Moles sometimes do not excavate perfectly vertically, nor are their tunnels perfectly straight at times. In order to follow the potentials contours of a non-linear tunnel, a system 1 and its component parts may be flexible or bendable, such as in a plumber's snake device. In this case, sharps 4 would likely need to be flexible as well, such as a stiff wire brush with sharpened ends.

The system 1 provides advantages are many over existing traps: there is no laborious digging of the lawn to place and retrieve the trap; there is no additional destruction of the lawn with the trap placement; the device is easy to install, retrieve and reinstall elsewhere; the device is safer for children and pets; there are no decomposing bodies to dispose; and there are no undesirable environmental impacts.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A mole eradication system comprising:
   a sleeve having a distal end for positioning in the ground;
   a rod having a distal end axially extending at least partially within said sleeve;
   at least one sharp connected near the distal end of said rod and radially extending from said rod;
   said sleeve and said rod axially movable in a first direction with respect to each other to radially expose said at least one sharp near a distal end of said sleeve;
   wherein the at least one sharp is biased to a radially extended position, and wherein said sleeve retains said at least one sharp against its bias.

2. The mole eradication system of claim 1, wherein said sleeve and said rod axially movable in a second direction with respect to each other to retract said at least one sharp.

3. The mole eradication system of claim 1, wherein the sleeve moves axially relative to the rod to expose the at least one sharp.

4. The mole eradication system of claim 1, wherein the rod moves axially relative to the sleeve to expose the at least one sharp.

5. The mole eradication system of claim 1, wherein the at least one sharp is rigidly connected to said rod.

6. The mole eradication system of claim 1, wherein the at least one sharp has a pointed tip.

7. The mole eradication system of claim 1, wherein the at least one sharp has an arcuate blade edge.

8. The mole eradication system of claim 7, wherein the blade edge arcs in a circumferential direction.

9. The mole eradication system of claim 1, wherein the sharp is a set of bristles.

10. The mole eradication system of claim 1, wherein the sharp is a circular blade.

11. The mole eradication system of claim 1, wherein the sleeve rotates relative to the rod to expose the at least one sharp.

12. A mole eradication system comprising:
    a sleeve having a distal end for positioning in the ground;
    a rod having a distal end axially extending at least partially within said sleeve;
    at least one sharp connected near the distal end of said rod and radially extending from said rod; and
    at least one slit on the sleeve through which the at least one sharp extends;
    said sleeve and said rod axially movable in a first direction with respect to each other to radially expose said at least one sharp near a distal end of said sleeve.

13. The mole eradication system of claim 1, wherein the sleeve has a nose cone.

14. The mole eradication system of claim 12, further comprising a handle on the rod which moves the at least one sharp through the at least one slit.

15. The mole eradication system of claim 12, wherein the at least one sharp is a blade.

16. The mole eradication system of claim 12, wherein the at least one sharp is a needle spike.

17. The mole eradication system of claim 12, wherein the at least one slit is a plurality of slits, the plurality of splits being disposed in bands around the sleeve.

18. The mole eradication system of claim 17, wherein each of the plurality of slits corresponds with at least one sharp.

19. A mole eradication system comprising:
    a sleeve having a distal end for positioning in the ground;
    a rod having a distal end axially extending at least partially within said sleeve;
    at least one sharp connected near the distal end of said rod and radially extending from said rod;
    said sleeve and said rod axially movable in a first direction with respect to each other to radially expose said at least one sharp near a distal end of said sleeve;
    wherein the sleeve and the at least one sharp are flexible.

* * * * *